United States Patent

Winbom

(10) Patent No.: US 9,201,745 B2
(45) Date of Patent: Dec. 1, 2015

(54) METHOD OF IMPROVING REPLICA SERVER PERFORMANCE AND A REPLICA SERVER SYSTEM

(75) Inventor: Håkan Winbom, Sollentuna (SE)

(73) Assignee: OMX Technology AB, Stockholm (SE)

( * ) Notice: Subject to any disclaimer, the term of this patent is extended or adjusted under 35 U.S.C. 154(b) by 2028 days.

(21) Appl. No.: 12/010,317

(22) Filed: Jan. 23, 2008

(65) Prior Publication Data

US 2009/0187600 A1 Jul. 23, 2009

(51) Int. Cl.
*G06F 17/30* (2006.01)
*G06F 11/20* (2006.01)

(52) U.S. Cl.
CPC ........ *G06F 11/2069* (2013.01); *G06F 11/2071* (2013.01); *G06F 11/2097* (2013.01); *G06F 17/30575* (2013.01)

(58) Field of Classification Search
CPC .............................................. G06F 17/30575
See application file for complete search history.

(56) References Cited

U.S. PATENT DOCUMENTS

| | | | |
|---|---|---|---|
| 5,455,932 A | 10/1995 | Major et al. | |
| 5,745,753 A | 4/1998 | Mosher, Jr. | |
| 5,937,414 A * | 8/1999 | Souder et al. | 707/616 |
| 5,941,999 A | 8/1999 | Matena et al. | |
| 6,035,415 A | 3/2000 | Fleming | |
| 6,178,441 B1 | 1/2001 | Elnozahy | |
| 6,289,357 B1 | 9/2001 | Parker | |
| 6,304,980 B1 | 10/2001 | Beardsley et al. | |
| 6,411,991 B1 | 6/2002 | Helmer et al. | |
| 6,446,090 B1 | 9/2002 | Hart | |
| 6,526,487 B2 | 2/2003 | Ohran et al. | |
| 6,842,825 B2 | 1/2005 | Geiner et al. | |
| 7,111,004 B2 | 9/2006 | Beardsley et al. | |
| 7,130,974 B2 | 10/2006 | Iwamura et al. | |
| 7,139,851 B2 * | 11/2006 | Fujibayashi | 710/58 |
| 7,321,906 B2 | 1/2008 | Green | |
| 7,373,468 B1 * | 5/2008 | Gupta | 711/162 |
| 7,562,103 B2 | 7/2009 | Kawamura et al. | |
| 7,865,536 B1 * | 1/2011 | Ghemawat et al. | 707/819 |
| 2001/0047412 A1 | 11/2001 | Weinman, Jr. | |
| 2002/0065827 A1 | 5/2002 | Christie et al. | |
| 2002/0194203 A1 | 12/2002 | Mosher, Jr. | |
| 2003/0093638 A1 | 5/2003 | Margerie et al. | |

(Continued)

FOREIGN PATENT DOCUMENTS

| | | |
|---|---|---|
| JP | H11-338647 | 10/1999 |
| JP | 2004-303025 | 10/2004 |
| JP | 2007-128335 | 5/2007 |
| WO | WO 2004/017194 | 2/2004 |

OTHER PUBLICATIONS

International Search Report mailed Jul. 3, 2009 in corresponding PCT Application PCT/EP2009/050254.

(Continued)

*Primary Examiner* — Mohammad S Rostami
(74) *Attorney, Agent, or Firm* — Nixon & Vanderhye P.C.

(57) ABSTRACT

An adaptable replica server system comprising a primary replica being associated with a primary storage for storing information and a primary processing means, and a secondary replica being associated with a secondary storage and a secondary processing means for creating confirmation data upon receiving input data from the primary replica. The replica server system is configurable to work as an asynchronous server replica system and/or as a synchronous server replica system depending on an instruction.

6 Claims, 4 Drawing Sheets

(56) References Cited

U.S. PATENT DOCUMENTS

| | | | |
|---|---|---|---|
| 2003/0172275 A1* | 9/2003 | Lee et al. | 713/176 |
| 2003/0187847 A1 | 10/2003 | Lubbers et al. | |
| 2003/0212869 A1 | 11/2003 | Burkey | |
| 2004/0044865 A1 | 3/2004 | Sicola et al. | |
| 2004/0098425 A1* | 5/2004 | Wiss et al. | 707/204 |
| 2004/0133591 A1* | 7/2004 | Holenstein et al. | 707/102 |
| 2004/0158588 A1* | 8/2004 | Pruet, III | 707/204 |
| 2004/0215596 A1 | 10/2004 | Fukuhara et al. | |
| 2005/0027737 A1 | 2/2005 | Micka et al. | |
| 2005/0108264 A1* | 5/2005 | Sinclair et al. | 707/100 |
| 2005/0160315 A1 | 7/2005 | Chandrasekaran et al. | |
| 2006/0020635 A1* | 1/2006 | Green | 707/200 |
| 2006/0218210 A1* | 9/2006 | Sarma et al. | 707/204 |
| 2007/0239944 A1* | 10/2007 | Rupanagunta et al. | 711/147 |
| 2009/0157766 A1* | 6/2009 | Shen et al. | 707/202 |

OTHER PUBLICATIONS

Lyon, J., "Design Considerations in Replicated Database Systems for Disaster Protection", Intellectual Leverage. San Francisco, Feb. 29-Mar. 4, 1988, [Computer Society International Conference], Washington, IEEE Comp. Soc. Press, U.S. vol. Conf. 33, pp. 428-430, XP010011545.

Office action mailed Jan. 12, 2007 in co-pending U.S. Appl. No. 10/897,436.

International Search Report mailed Feb. 8, 2006 in corresponding International Application No. PCT/EP2005/053090.

Written Opinion of the Intellectual Property of Singapore, Dec. 17, 2010, in corresponding Singapore Application No. 201004106-9.

English summary of Japanese Office Action mailed Jun. 18, 2013 in Japanese Application No. 2010-543455.

* cited by examiner

METHOD OF IMPROVING REPLICA SERVER PERFORMANCE AND A REPLICA SERVER SYSTEM

TECHNICAL FIELD

The technology relates to replica server systems.

BACKGROUND

Failsafe operation of information technology systems is of fundamental importance for most modern society activities. Due to this there are many precautionary systems that are made to handle situations of failure.

Such systems could comprise safeguarding of information via memory backup systems as well as safeguarding of complete system functionality. The latter could comprise completely mirrored or redundant systems, where all actions are executed in primary and secondary system components (computer, processor, server, etc).

There are essentially two categories of replication: synchronous and asynchronous replication.

In a synchronous replica system a customer does not get any confirmation for his transaction until it has reached both the primary site and the disaster recovery site. This implies that the latency for the transaction is increased at least by the round trip between primary and disaster recovery site.

In an asynchronous replica system the customer gets a confirmation as soon as the primary has received it, and replication to the disaster recovery site is best effort as soon as possible. This implies that in case of a disaster occurring at the primary site, there is a risk that some transactions confirmed to customers are actually not present at the disaster recovery site. An example of such a system is described in US 2006/0020635.

In existing replica server system it is currently typically a basic IT architecture decision if one wants to use asynchronous or synchronous replication. For example in the case of an electronic exchange, neither the electronic exchange nor its participants can choose which policy to use.

In the financial field, e.g. electronic exchange systems for stocks, bonds, derivates, etc, failsafe high-speed in-memory servers are used. These systems are also referred to as replica server systems. Similar to the above disclosed system, a replica server system comprises a primary replica and a secondary replica, both being identical and in the same state. Should the primary replica fail, the secondary replica will take over immediately. Of course, the system may contain several secondary replicas to improve safety. Upon failure of the primary replica, one of the secondary replicas will then become a new primary replica, while the others remain as secondary replicas.

The recent trend of program/algorithmic trading in the financial field, and the evolution of competitive electronic exchanges, e.g. the same security being trading at more than one exchange, has created a need for minimum latency. The current expectation level is to have sub millisecond response time on order transactions. This expectation is more or less impossible due to speed of light limitations, if synchronous replication is used and there is a reasonable distance between the primary and disaster recovery sites.

Moreover, in some applications, e.g. Government Bond trading, the value of an individual transaction is so high that synchronous replication is a must. No one is prepared to accept the risk of losing one such transaction in case of fail-over to the disaster recovery site.

Thus one problem with present replica server systems and other similar systems is the architecture of the system. Either they are synchronous or asynchronous as described above, and thus, the systems are not flexible.

Another problem with known replica server systems is that they do not differ between different messages.

There is thus a need for an adaptable replica server system and especially a replica server system that considers different types of messages while operating large numbers of parallel transactions.

SUMMARY

A method and system of improving replica server system performance are provided.

The replica server system manages different type of input data differently depending on the content of the input data.

Thus according to a first aspect, an adaptable replica server system comprises a primary replica being associated with a primary storage for storing information and a primary processing means, and a secondary replica being associated with a secondary storage and a secondary processing means for creating confirmation data upon receiving input data from the primary replica, wherein the replica server system is designed to be configurable so at to work as an asynchronous server replica system and/or as a synchronous server replica system depending on an instruction.

Thus in one embodiment the replica server system may comprise a user interface whereby a user can set an instruction parameter so that the replica server system either works as a synchronous replica server system or as an asynchronous replica server system.

In another embodiment the adaptable replica server system may be configured to treat different input data differently. Thus depending on a content value in the input data the replica server system may either act as an asynchronous server replica system or as a synchronous server replica system. Thus the replica server system checks each input data and decides on how the checked input data should be managed.

In a further embodiment the adaptable replica server system, may work as an asynchronous server replica system and/or as a synchronous server replica system depending on input data comprising an attribute. Thus a user can, for each input data sent to the adaptable replica server system, decide how a specific input data should be treated by setting a value to the attribute as will be described below.

In an embodiment of the method, input data received by a primary replica is transferred to a secondary replica.

Output data from the primary replica can be sent as soon as the primary replica have stored and processed the input data or it can be sent once the primary replica has received confirmation data from the secondary replica. Thus, when the secondary replica has received the input data and acknowledges it by returning confirmation data to the primary replica. When the output data is sent from the primary replica may depend on an attribute that the input data comprises. Thus input data comprising an attribute can be sent to the replica server system. Preferably the attribute has the value set to safe or to fast. If the value is set to fast the output data is sent from the primary replica as soon as the primary replica have stored and processed the input data. If the value is set to safe the output data is sent from the primary replica after the primary replica have received confirmation data from the secondary replica.

Notably, there is with this method possible for customers or participants of the server replica system to decide on how they want the system to work, thus an adaptable server replica system is realized that can be tailored to each user and participant specific need, and even adapted to each specific data input.

Thus, according to a second aspect of a replica server system that includes a primary replica being associated with a primary storage for storing information and a primary processing means, and a secondary replica being associated with a secondary storage and a secondary processing means for creating confirmation data upon receiving input data from the primary replica, a method for improving that system comprises the steps of:

receiving input data comprising at least one attribute,
transferring input data from said primary replica to said secondary replica upon receiving same,
processing said input data in said primary processing means after storing said input data, thus creating original output data
based on the attribute, sending said original output data either after said original output data is created by said primary processing means or upon receiving said confirmation data from said secondary replica.

With the above method a more flexible solution can be achieved since the architecture does not need to fixed and decided on in the early stages of the development or implementation process. Instead the configuration can be done when setting up the system, or it can continuously be monitored and input data can be managed either asynchronously or synchronously. Thus by managing input data by its content for example by the attribute, it is possible to adapt the replica server system to specific needs and situations.

Preferably the attribute comprises at least one of the following values: Safe and/or Fast. However other values may also be chosen, or the input data can be classified automatically to belong to either safe or fast based on a content value in the input data. For example if the input data comprises an order to an electronic exchange and the order has a high volume (large number of instruments) and/or the instruments has a high price. In such a case the replica server system can automatically classify the input data to belong to safe, whereas input data with little volume or low priced instruments may be classified as fast. This classification can be done at the first replica server in an electronic exchange. However the classification may also be done at a participant's broker work station or at a server at the participant's location, such as a gateway or any other network device that is located outside an electronic exchange. Thus, input data received from such a broker work station or electronic device will already comprise an attribute having a value when it arrives at the first server replica.

Thus, the server replica system may further comprise an identifier for identifying and classifying such input data, the input data further comprises a content value, the identifier being configured to identifying the content value in the input data and based on the content value, assigning the attribute in the input data a value.

According to a third aspect, a replica server system comprises a primary replica having a primary input, a primary output, a primary storage and a primary processor associated with it which is connected to a secondary replica having a secondary input, a secondary output, a secondary storage and a secondary processor associated with it, said primary replica being configured to transfer received input data comprising at least one attribute value to said secondary replica, store said input data on said primary storage, process said input data on said primary processor to create original output data and based on the attribute value sending said original output data either as soon as original output data is created in said primary processing means or send out said original output data through said primary output after receiving confirmation data from said secondary replica that said input data has been received, and said secondary replica being configured to generate said confirmation data upon receiving said input data on said secondary input.

According to a fourth aspect, a replica server system comprises: primary replica means; secondary replica means; means for communicating internally between said primary replica means and said secondary replica means and externally between said primary replica means and external sources, said means for communicating being configured to transfer input data comprising at least one attribute received by said primary replica means to said secondary replica means; means for storing said input data in said primary replica means; means for processing said input data in said primary replica means, thus creating original output data; means for generating confirmation data in said secondary replica means upon receiving said input data and transferring said confirmation data to said primary replica means via said means for communicating; and means for outputting said original output data either as soon as original output data is created in said primary processing means or upon receiving said confirmation data from said secondary replica, based on the attribute value.

According to a fifth aspect, a computer terminal is provided for entering and transmitting server input data to a server system, the input data comprising at least one attribute value. The computer terminal comprises setting means for setting the attribute value defining the server input data to be managed either as safe server input data or as fast server input data, upon arrival at the server system.

The computer terminal may be a broker work station from which orders are sent as input data into an electronic exchange comprising the replica server system. However the computer terminal may be any type of terminal such as a mobile terminal, i.e. a mobile phone, or other hand held device.

The server input data sent from the computer terminal may further comprise a content value, the setting means further being configured to set the attribute value based on the content value in a similar way to what is described above for the system.

The content value may belong to a group of content values, the group comprising: Instrument type, Volume, Value, and id. The content value may be chosen to be one or more of the above mentioned values.

Instrument type may for example be stocks, bonds, swaps, options, or any type of commodity such as oil, energy and so forth. Volume can be any type of volume applicable to the above mentioned instrument types. Thus for stocks it is preferably the number of stocks whereas for oil it may be barrels and for energy it may be watts, joule etc. Value can be either the price for one instrument of the value for the whole order thus volume*value. Id may for example be the ID of the participant sending the order.

DETAILED DESCRIPTION

Figure 1:
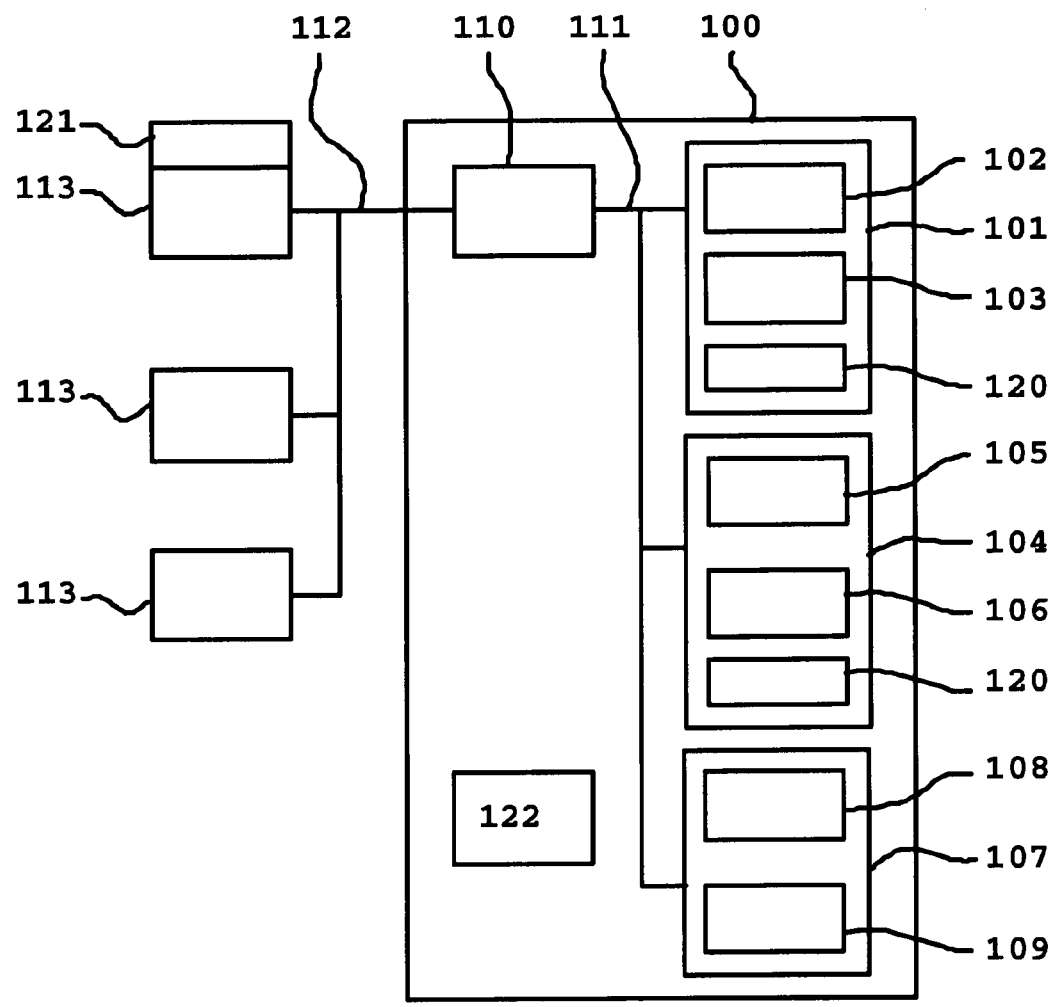
FIG. 1 is a schematic drawing of a first embodiment replica server system shown in an operating environment.

FIG. 1 generally depicts a replica server system 100. The replica server system 100 comprises a primary replica 101 having inter alia a primary storage 102 for storing information, a primary identifier 120 for identifying input data, a user interface 122 for configuring the system, and a primary processor 103 for processing data.

The primary storage 102 is preferably a buffer storage of known kind, but could also include a hard disc memory, a writable CD or DVD disc or any other known persistent memory capacity for data. Unlike prior art replica systems, however, the replica server system 100 will normally not flush after each event to write data on disc (although this may still be included—but that may reduce positive effects of the technology since flushing may be a capacity-limiting step in the process). Normal flushing when the buffer is full can of course take place (and will do so) to obtain a register of performed transactions.

The primary processor 103 could be any state of the art central processor or combination of processors used in computers, servers, etc.

Further, the replica server system 100 comprises a first secondary replica 104 and a second secondary replica 107. Basically, the replica server system 100 could comprise any number of secondary replicas suitable for the applications of the system. The first secondary replica 104 includes inter alia a first secondary storage 105, a first secondary identifier 120 and a first secondary processor 106, and the second secondary replica 107 includes inter alia a second secondary storage 105 a second secondary identifier (not shown) and a second secondary processor 106, all of which could have the same type of components used for the primary replica 101. In a hardware sense, the primary replica 101 and two secondary replicas 104, 107 can be (and preferably are) identical.

The primary replica 101 and the secondary replicas 104, 107 communicate internally via a communication unit 110 and communication link 111. The communication unit 110 also provides communication with external sources 113 via a communication network 112. The communication network 112 could use different communications channels for different external sources 113, e.g. via Ethernet LAN, telephone, satellite, etc. The external sources 113 could comprise terminals, computers, electronic exchanges or any other device(s) from which data to be processed by the replica server system 100 may originate. The external sources 113 also receive output data from the replica server system 100.

In use input data received from the external sources 113 is routed to the primary replica 101 via the communication unit 110 and communication link 111. The input data is then sent from the primary replica 101 to the secondary replicas 104, 107 via the communication unit 110 and communication link 111. Preferably, the input data is sent immediately from the primary replica 101 upon receiving it.

Similar to the communication network 112, the communication link 111 can comprise several different kinds of wired or wireless components, mainly depending on the location of the secondary replicas 104, 107. For instance, the first secondary replica 104 may be placed in the vicinity of the primary replica 101 and use a broadband connection, whereas the second secondary replica 107 may be placed far away and linked to the primary replica 101 via satellite.

When the secondary replicas 104, 107 receive the input data, they will generate confirmation data (acknowledgement) that they have received the input data and send the confirmation data to the primary replica 101. Preferably, acknowledgment is done immediately upon receiving the input data.

Meanwhile, the input data are saved onto the primary storage 102 and processed in the primary processor 103 in the primary replica 101. Hereby, original output data is created. Depending on the attribute value of the input data, the output data is sent when the data has been processed in the primary processor. If this is the case, the replica server system acts as an asynchronous replica server system. However, if the attribute value is set to safe mode, the output data is sent when the primary replica 101 receives the confirmation data from the secondary replica 104. Thus in this case the replica server system acts as a synchronous replica server system. In one embodiment, a process configured to check the value of the input data is preferably present in the primary and secondary replica. Thus the identifier 120 may be configured to check the attribute value in the input data so that the system manages the input data based on the attribute value which in this embodiment has been set outside the replica server system. In another embodiment, the identifier 120 may both assign the attribute value based on the content value and thereafter manage the input data based on what attribute value that has been assigned to the input data.

Independently of how the system is configured, the original output data is sent to the external sources 113 via the communication unit 110. It is sufficient for the safety of the replica server system 100 to allow the primary replica 101 to wait for the first acknowledgement from one of the secondary replicas 104, 107. This can essentially reduce latency; cf. the above example with the first secondary replica 104 located nearby and connected via a fast broadband communication link (e.g. Ethernet LAN 100 MB) and the second secondary replica 107 located far away and/or connected via a slow communication link (satellite). Notably, this will reduce latency for individual events or transactions, i.e. time span from input till output, not the number of transactions operable per time unit.

Once the primary replica 101 has sent the input data, it is ready to receive new input data (next input data). In line with what has already been described, once the next input data is received by the primary replica 101, it sends the next input data to the secondary replicas 104, 107 and then proceeds by storing and processing this next input data.

Preferably the external sources 113 are computer terminals configured to sent input data. The external sources preferably comprise setting means 121 in order to set an attribute value to input data that is to be sent. Setting means 121 can either be a keyboard that makes it possible for a user of the external source to manually set the attribute value. It can also be a module in a computer that is configured to automatically set the attribute value based on e.g. content value of the input data.

Figure 2A:
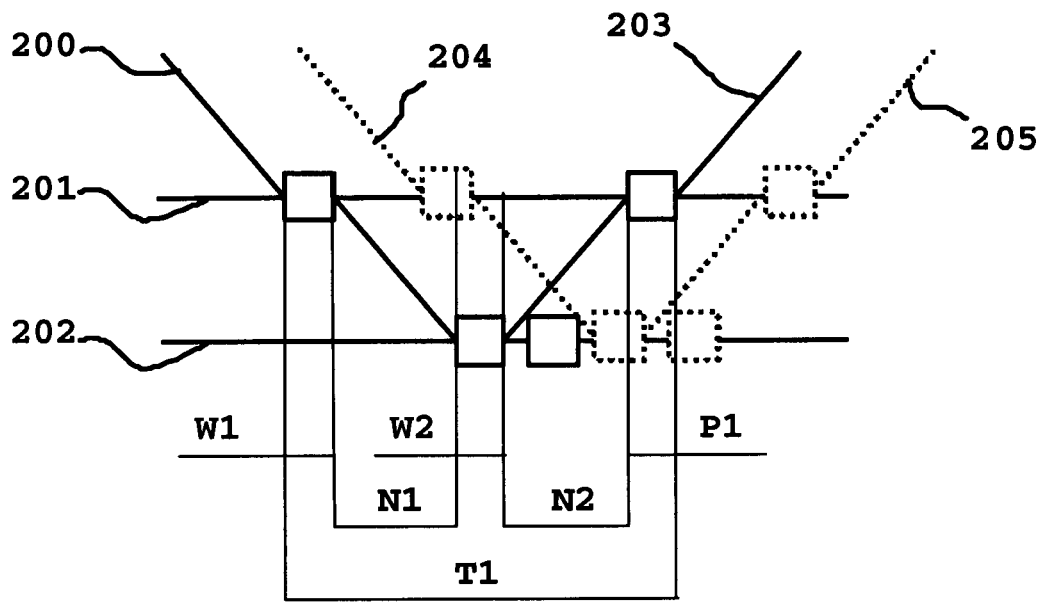
FIG. 2A shows on a schematic event line an event cycle for a state of the art replica server system.

FIG. 2A shows operational steps of a state of the art asynchronous replica server system.

Input data arrives as indicated with line 200 to a primary replica (represented by event line 201). The input data is stored on disc, a procedure that takes a certain disc write time, represented by designation W1. Following this, the input data is transferred to a secondary replica (represented by event line 202). This process takes time, depending on where the secondary is situated and is represented as network latency time N1. Again, the input data is written to disc, accumulating a second disc write time, W2, to the total time. Once the input data is also written on the secondary replica, acknowledgement (confirmation) is returned to the primary replica. A second network latency, N2, adds to the total time for the procedure. Finally, the primary replica may process the input data, which requires a process time P1 and output the result as indicated with designation number 203.

Figure 2B:
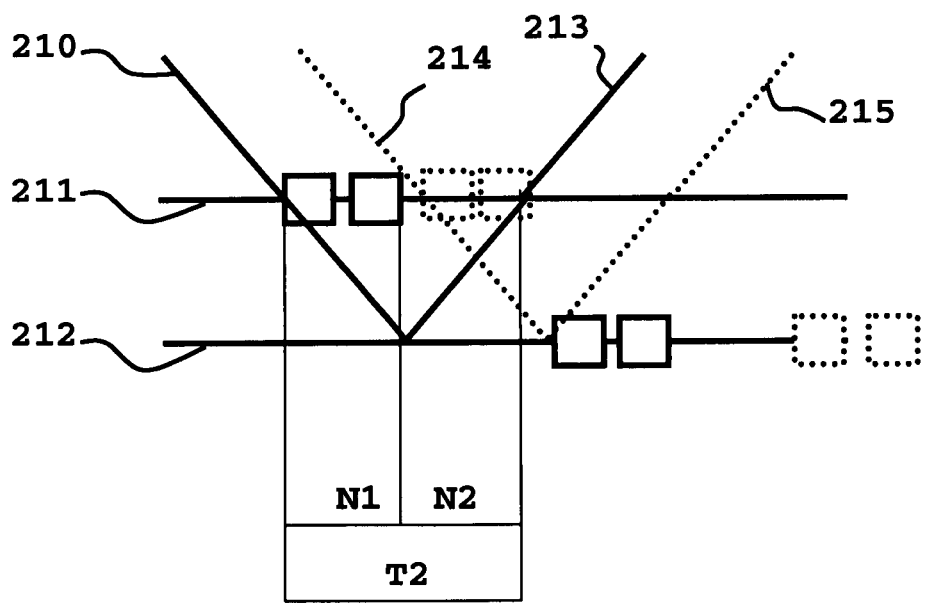
FIG. 2B shows on a schematic event line an event cycle for a replica server system.

It should be noted that event lines 201, 202 are not representative as linear real-time indicators. Write time W1, W2 is normally extensively longer than process time P1, for instance. FIGS. 2A and 2B are intended to illustrate the effects and benefits of the technology and not a real-time schedule of the server replica systems operations.

All in all, writing time W1, network latency N1, writing time W2, network latency N2 and process time P1 amounts to an accumulated time T1=W1+N1+W2+N2+P1 required to perform one operation (transaction).

Also in FIG. 2A, a next input data is indicated in dotted lines and with designation number 204. The same process is repeated with the next input data—all indicated with dotted lines—which ends with output data as indicated with numeral 205.

FIG. 2B illustrates one aspect of the timesavings obtained. Input data is indicated at 210 and reaches the primary replica (indicated by event line 211). The input data is immediately transferred to the secondary replica (indicated by event line 212), which takes a certain time depending on location of the secondary replica. Here, it is assumed that the placement is the same as in FIG. 2A. It thus requires network latency N1 to transfer the information. As soon as the secondary replica receives the input data, acknowledgement (confirmation data) is sent back to the primary replica, causing time delay of network latency N2. The processed data can be output at 213, i.e. as soon as the input data is processed and confirmation is received from the secondary replica.

Figure 3:
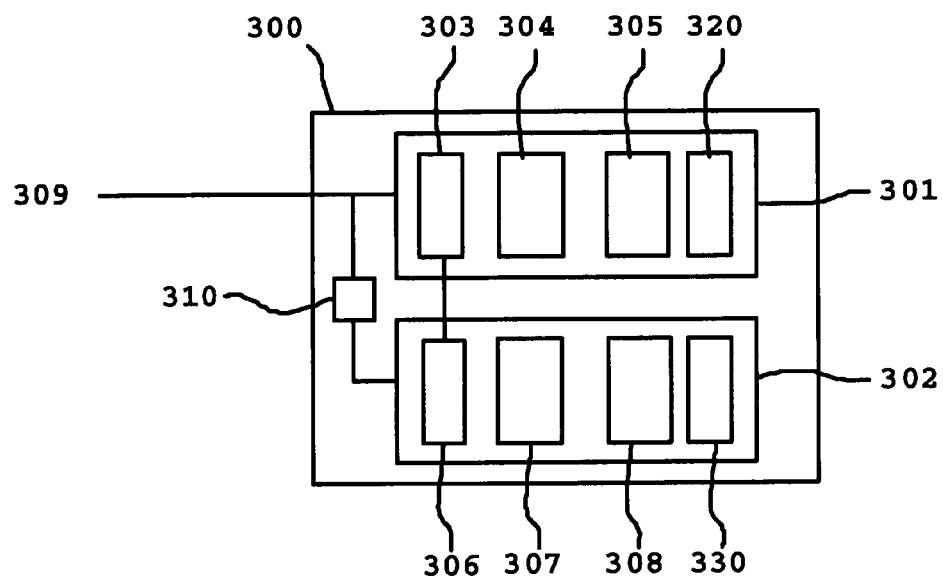
FIG. 3 is a schematic drawing of a second embodiment replica server system shown in an operating environment.

Turning now to FIG. 3, a second preferred example embodiment of a replica server system 300 is schematically described.

The replica server system 300 comprises a primary replica 301 and a secondary replica 302. The primary replica 301 includes a primary communication module 303, a primary storage 304, a primary identifier 320 and a primary processor 305. The secondary replica 302 likewise includes a secondary communication module 306, a secondary storage 307, a secondary identifier 330 and a secondary processor 308. As with the first embodiment in FIG. 1, any known component enabling communication, storing and processing could be utilised. Likewise, the different components could be separate units or integrated into one or more units. Other functionalities can also be included within the replicas 301, 302.

The primary communication module 303 and the secondary communication module 306 are linked (by wire or wireless) to enable communication between the primary replica 301 and secondary replica 302. The primary communication module 303 can also communicate with external sources (not shown) via communication link 309 (wire or wireless). In case of failure of the primary replica 301, the secondary replica 302 will become a new primary replica. In such case a router 310 will enable the secondary replica 302 to communicate with the external sources. The function of the router 310 could also be implemented (hardware or software) in the primary communication module 303 and the secondary communication module 306.

When input data arrives from an external source via communication link 309, the primary replica 301 will transfer the input data to the secondary replica 302 and then proceed by storing the input data in the primary storage 304 and processing the input data in primary processor 305. Once acknowledgement or confirmation data is received from the secondary replica 302, the processed data can be output back to the external sources. When a next input data is received and transferred to the secondary replica 302 or when information data from the primary replica 301 indicate that the input data has been processed successfully, the secondary replica can store and process the input data.

Figure 4:
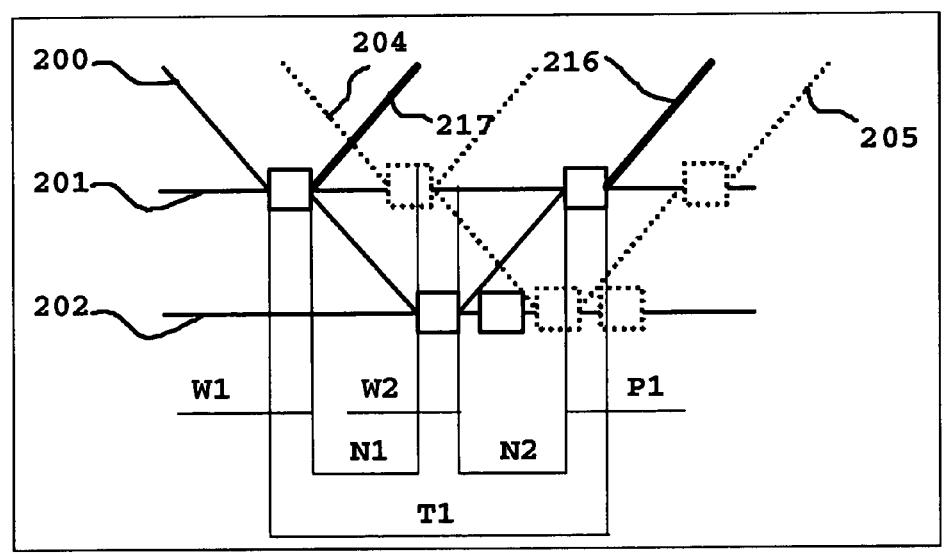
FIG. 4 shows on a schematic event line an event cycle.
Figure 5:
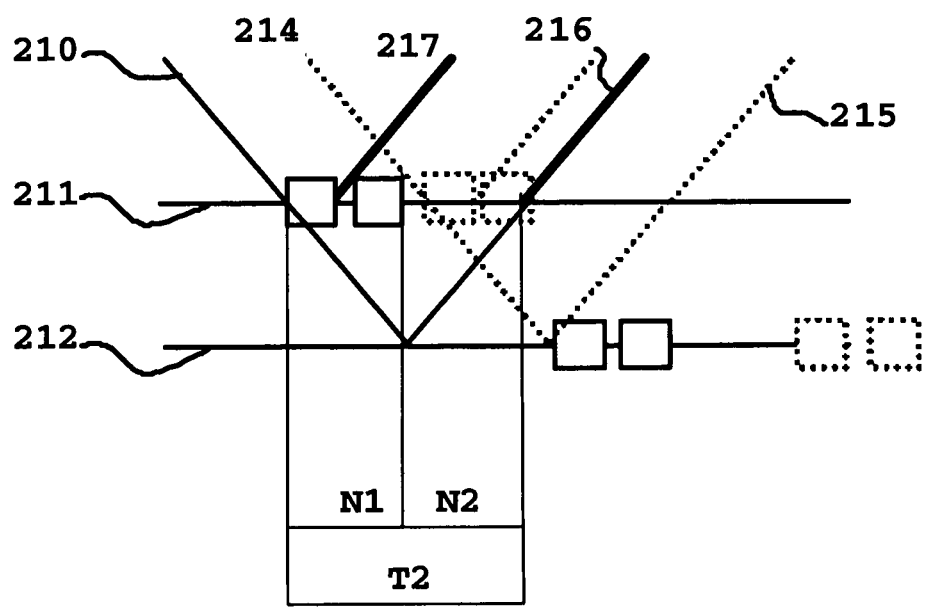
FIG. 5 shows on a schematic event line an event cycle.

FIG. 4 and FIG. 5 illustrate aspects of advantages according to the technology in relation to prior art systems. The options that the output data can be sent are illustrated by lines 216 and 217. The time lag between these lines is the time difference in response time for safe input data and fast input data. The response for fast input data is line 217.

When input data arrives at the primary replica some processing time may be needed in order to check what attribute the order comprises.

Figure 6:
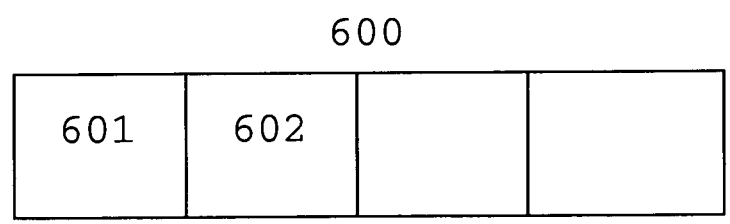
FIG. 6 illustrates a structure of input data.

In FIG. 6 an example of input data 600 is illustrated. The input data may comprise an attribute value 601 and a content value 602.

Usually the content value is automatically assigned when the input data is created at the external device 113. For example in a trading system when a trader creates an order the trading application creates an order comprising a volume and a price.

All functionalities described above are applicable for the embodiment in FIG. 1. Combinations between the shown embodiments are also possible. For instance, the embodiment in FIG. 3 can include the user interface 122 or more than one secondary replica and the replicas in FIG. 1 can all include communication means for the internal communication between replicas.

Other embodiments are viable with simple and straightforward modifications of the embodiments disclosed above. These also fall within the scope of the accompanying claims.

I claim:

1. A method for a replica server system comprising a primary replica being associated with a primary storage for storing information and a primary processor, and a secondary replica being associated with a secondary storage and a secondary processor for creating confirmation data upon receiving input data from the primary replica, the method comprising the steps of:
   receiving input data comprising at least one attribute,
   transferring input data from said primary replica to said secondary replica upon receiving same,
   processing said input data in said primary processor after storing said input data, thus creating output data,
   sending said output data at an earlier time right after said output data is created by said primary processor if the attribute is a first value, and
   sending said output data at a later time after receiving said confirmation data from said secondary replica if the attribute is a second value different from the first value.

2. A method according to claim 1, wherein the attribute comprises at least one of the following values:
   Safe,
   Fast.

3. A method according to claim 1, wherein the server replica system further comprises an identifier, the input data further comprises a content value, the identifier being configured to identify the content value in the input data and based on the content value, assign the attribute in the input data a value.

4. A replica server system comprising:
   a primary replica having a primary input, a primary output, a primary storage, and a primary processor;
   a secondary replica, connected to the primary replica, having a secondary input, a secondary output, a secondary storage, and a secondary processor,
   said primary replica being configured to transfer received input data comprising at least one attribute value to said secondary replica, store said input data on said primary storage, process said input data on said primary processor to create output data, and based on the attribute value, send said output data either at a first time as soon as output data is created in said primary processor or send out said output data through said primary output at a second time later than the first time after receiving confirmation data from said secondary replica that said input data has been received, and said secondary replica being configured to generate said confirmation data upon receiving said input data on said secondary input.

5. A replica server system according to claim 4, wherein the attribute value comprises at least one of the following values:
Safe,
Fast.

6. A replica server system comprising
primary replica means;
secondary replica means;
means for communicating internally between said primary replica means and said secondary replica means and externally between said primary replica means and external sources, said means for communicating being configured to transfer input data comprising at least one attribute received by said primary replica means to said secondary replica means;

means for storing said input data in said primary replica means;

means for processing said input data in said primary replica means, thus creating original output data;

means for generating confirmation data in said secondary replica means upon receiving said input data and transferring said confirmation data to said primary replica means via said means for communicating; and means for outputting said original output data either as soon as original output data is created in said primary processing means when the attribute value is a first attribute value and for outputting said original output data upon receiving said confirmation data from said secondary replica when the attribute value is a second attribute value different than the first attribute value.

* * * * *